United States Patent [19]

Myers

[11] Patent Number: 4,696,438

[45] Date of Patent: Sep. 29, 1987

[54] SPOOL FOR HOLDING OPTICAL FIBER

[75] Inventor: Daryl L. Myers, Lawrenceville, Ga.

[73] Assignee: American Telephone and Telegraph Company AT&T Technologies, Inc., Berkeley Heights, N.J.

[21] Appl. No.: 922,593

[22] Filed: Oct. 24, 1986

[51] Int. Cl.[4] .................. B65H 55/00; B65H 75/14
[52] U.S. Cl. ................... 242/118.41; 242/18 A; 242/18 PW; 242/118.7; 242/159; 242/165; 242/167
[58] Field of Search ............ 242/118.41, 118.4, 118.5, 242/118.6, 118.61, 118.62, 118.7, 118.8, 77, 77.2, 77.3, 74.4, 159, 165, 166, 167, 176, 25 R, 25 A, 16, 17, 125.1, 18 R, 18 A, 18 PW

[56] References Cited

U.S. PATENT DOCUMENTS

| | | |
|---|---|---|
| 200,706 | 2/1878 | Fay . |
| 216,666 | 6/1879 | Fay . |
| 996,356 | 6/1911 | McLaughlin . |
| 1,909,277 | 5/1933 | Jamar, Jr. .................. 242/167 |
| 2,016,311 | 10/1935 | Becker . |
| 2,283,710 | 5/1942 | Waterbury ................ 242/167 |
| 2,340,574 | 2/1944 | Ashworth ................ 242/118.4 |
| 2,341,369 | 2/1944 | Fornwald, Jr. ............ 242/25 R |
| 2,604,275 | 7/1952 | Hull ........................ 242/167 X |
| 2,908,093 | 10/1959 | Curry .................... 242/118.7 X |
| 3,001,730 | 12/1961 | Martino .................. 242/25 R |
| 3,176,932 | 4/1965 | Kovaleski ............... 242/118.41 X |
| 3,300,153 | 1/1967 | Fenn . |
| 3,845,320 | 10/1974 | Winberg ................ 242/118.4 X |
| 3,845,913 | 11/1974 | Hagen .................... 242/25 R |
| 3,934,767 | 1/1976 | Jones .................... 242/118.7 X |
| 3,985,359 | 10/1976 | Moore ................... 242/118.41 |
| 4,076,185 | 2/1978 | Dorph ................... 242/118.41 |
| 4,291,841 | 9/1981 | Dalrymple et al. . |
| 4,387,863 | 6/1983 | Edmonston et al. . |
| 4,418,877 | 12/1983 | Nakajima ............... 242/118.41 X |
| 4,471,920 | 9/1984 | Ditton et al. ............ 242/118.7 X |
| 4,542,862 | 9/1985 | Romike et al. . |
| 4,545,542 | 10/1985 | Frazee, Jr. et al. ........ 242/18 A |
| 4,602,751 | 7/1986 | Vogel .................... 242/118.4 |

FOREIGN PATENT DOCUMENTS 762562 11/1956 United Kingdom ......... 242/118.41

Primary Examiner—Stanley N. Gilreath
Attorney, Agent, or Firm—E. W. Somers

[57] ABSTRACT

A spool (20) which is used in the taking up and the paying out of a relatively long length of optical fiber includes two flanges (24, 26) and a hub (22) with each flange being tapered. The spool includes a collector (30) which is formed adjacent to one of the two tapered flanges of the spool and which provides access to the initial or leading end portion of the length of optical fiber which is wound on the spool. A groove (32) of the collector communicates with the hub of the spool through each of the two diametrically opposed slots (28—28) in the adjacent tapered flange (24). This allows the optical fiber to be wound on one of two coaxially mounted spools and to be transferred to the other spool with the first few convolutions being received in the groove and then passed through one of the slots in the adjacent tapered flange onto the hub. In order to prevent losses in the optical fiber portion (44) which extends through one of the slots, each slot is sufficiently wide to avoid unduly sharp curvature of the optical fiber portion. The spool with outwardly sloped flanges provides for a stable winding pattern which prevent snags in pay out operations. The capacity of this spool with a stable winding pattern may be maximized by optimizing the slope of the tapered flanges.

13 Claims, 9 Drawing Figures

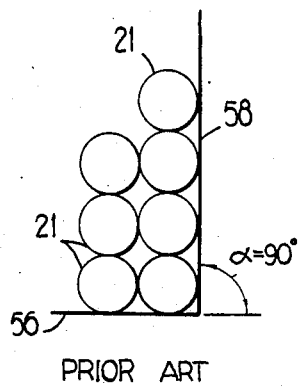
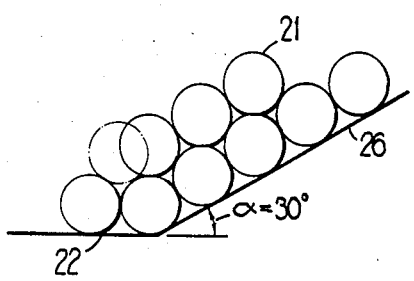
FIG 5  FIG 6
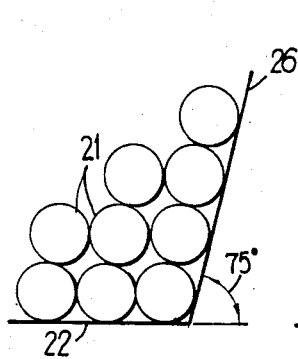 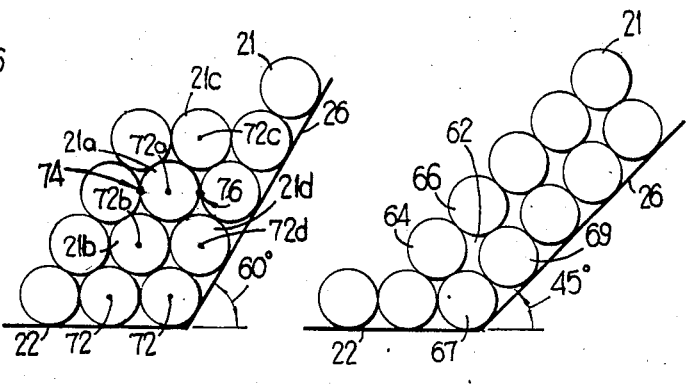
FIG 7A  FIG 7B  FIG 7C

SPOOL FOR HOLDING OPTICAL FIBER

TECHNICAL FIELD

This invention relates to a spool for holding optical fiber. More particularly, it relates to a spool which may be used in the manufacture and processing of optical fiber, which provides access to both end portions of the optical fiber, and which provides the capability for winding a pattern having a high degree of stability and freedom from snarls between layers of convolutions of the fiber.

BACKGROUND OF THE INVENTION

Optical fiber has become a widely accepted form of transmission media. A continuous length of the fiber is drawn from an optical preform which may be made by any one of several known processes. Afterwards, or as part of a tandem process, the drawn fiber is coated, cured, measured and taken up, desirably in an automatic takeup apparatus, on a spool. Methods and apparatus for taking up optical fiber are disclosed and claimed in U.S. Pat. No. 4,291,841 which issued on Sept. 29, 1981 in the names of P. W. Dalrymple, M. J. Hyle, D. L. Myers and J. W. Wright.

The spool on which the optical fiber is taken up has other uses. It is used to store the optical fiber, to pay out and to take up the fiber for other operations such as ribboning, cabling, and rewinding and is used to ship optical fiber which is wound thereon to other companies which further process the fiber.

It has been common practice in the industry to use a molded spool having disc-like flanges connected through a cylindrical hub and being molded from an ABS or polyethylene material, for example. Typically, the spool most commonly used to date includes a hub having a 10.2 cm traverse and a diameter of about 15.2 cm whereas the flange has a diameter of about 20.3 cm. Generally, the barrel or hub has been covered with a foam-like material which acts as a cushion and stabilizes the convolutions of the optical fiber.

The above-described spool proved to be quite satisfactory in the early years of optical fiber manufacture when the preform size limited the amount of fiber drawn from the preform and usually did not exceed about 2000 meters. Further, for these lengths, the winding pattern did not prove to be critical. In one pattern, the convolutions were such that the package had a greater diameter at a midpoint of the hub with a diameter which decreased gradually toward each flange. Another pattern included a package which was uniformly thick over most of the hub length and which had a tapered end adjacent to one of the flanges. See for example, U.S. Pat. No. 4,545,542 which issued on Oct. 8, 1985 in the names of R. E. Frazee, Jr. et al.

As one might expect, efforts were made to increase the size of the preforms to increase the length of the optical fiber in each draw run. In order to accomodate these longer runs, some optical fiber producers began to use a spool having a longer hub length, which improved the stability of the package by minimizing layer height build-up with a winding pattern which sloped downward toward the hub at one or both flanges. However, minimizing layer height and sloping the winding pattern resulted in a package which was smaller than the capacity of this spool. Another method included using a spool having larger diameter flanges than those used in the past and the winding of the optical fiber flange-to-flange. Winding flange-to-flange when the flanges are disc-like often times results in a gap being formed between the last convolution in a layer and the adjacent spool flange. As a result, the last convolution of the next successive layer may fall into the gap, may descend several layers and may cause a snarling during payout. In order to avoid this, an open wind pattern frequently is used, but this winding arrangement tends to reduce the capacity of the package.

A spool which is used in the takeup of optical fiber as well as for further processing and for shipping must also have at least one additional feature. Both ends of the optical fiber which is wound on the spool must be accessible for measurement and characterization purposes. It should be apparent that the last portion of the length of optical fiber which is wound on the spool is readily accessible. However, provisions must be made for accessing the initial portion of the length of the optical fiber which is wound on the spool. Also, following the measurement and characterization, it still may be desirable to have both ends accessible for further processing.

Such a sought after spool does not appear to be available in the prior art. What is needed and seemingly what is not provided is a spool on which a relatively long length of optical fiber may be taken up and which provides access to each end of the optical fiber. Further, the sought-after spool should be such that the package of optical fiber which is wound thereon is stable and is devoid of snarled convolutions which would impair payout of the optical fiber from the spool.

SUMMARY OF THE INVENTION

The foregoing problems have been overcome by the spool of this invention which is used to accumulate optical fiber drawn from a preform, for example, and to pay out optical fiber in subsequent processes as well as to store and ship optical fiber. The spool includes a hub having a longitudinal axis and a cross sectional configuration which is normal to the longitudinal axis and which has a generally circular configuration. First and second flanges are attached to opposite ends of the hub. Each flange has a truncated conical shape with a large diameter portion thereof facing outwardly and a small diameter portion being attached to the hub. Further, the first flange includes a slot which is formed radially of the flange. Also, a collector is attached to the first flange to collect a few convolutions of the optical fiber and to provide access to one end portion of the length of optical fiber which is wound on the spool. The collector includes a disc-like flange and a cylindrical surface on which are wound convolutions of optical fiber.

The slot in the first flange allows a portion of the optical fiber to extend therethrough to connect the optical fiber on the collector to the optical fiber on the hub. Advantageously, the slot in the first flange is sufficiently wide so that micro- or macro-bending of the portion of the length of the optical fiber which extends therethrough is inhibited substantially. Also, the first flange has a substantially uniform thickness with a large diameter portion thereof overhanging the collector groove which is defined by the cylindrical surface, the disc-like flange and the first flange. This further helps to minimize the curvature of the portion of the length of optical fiber which extends through the slot in the first flange to inhibit any micro-or macro-bending losses. Advantageously, the spool of this invention increases the stability of the convolutions of optical fiber comprising the package. Also, the spool is easily handled and its use results in reduced problems during payment.

BRIEF DESCRIPTION OF THE DRAWINGS

Other features of the present invention will be more readily understood from the following detailed description of specific embodiments thereof when read in conjunction with accompanying drawings, in which:

FIG. 5 is a longitudinal sectional schematic view of a portion of a prior art spool having a hub adjacent to a flange in which the flange is normal to the hub;

FIG. 6 is a longitudinal sectional schematic view of a portion of a spool hub adjacent to a flange in which an outer surface of the flange makes an acute angle with the hub; and FIGS. 7A-7C are a series of longitudinal sectional schematic views of a portion of a spool adjacent to a flange in which an outer surface of the flange is at an angle other than 90° to the hub.

DETAILED DESCRIPTION

Figure 2:
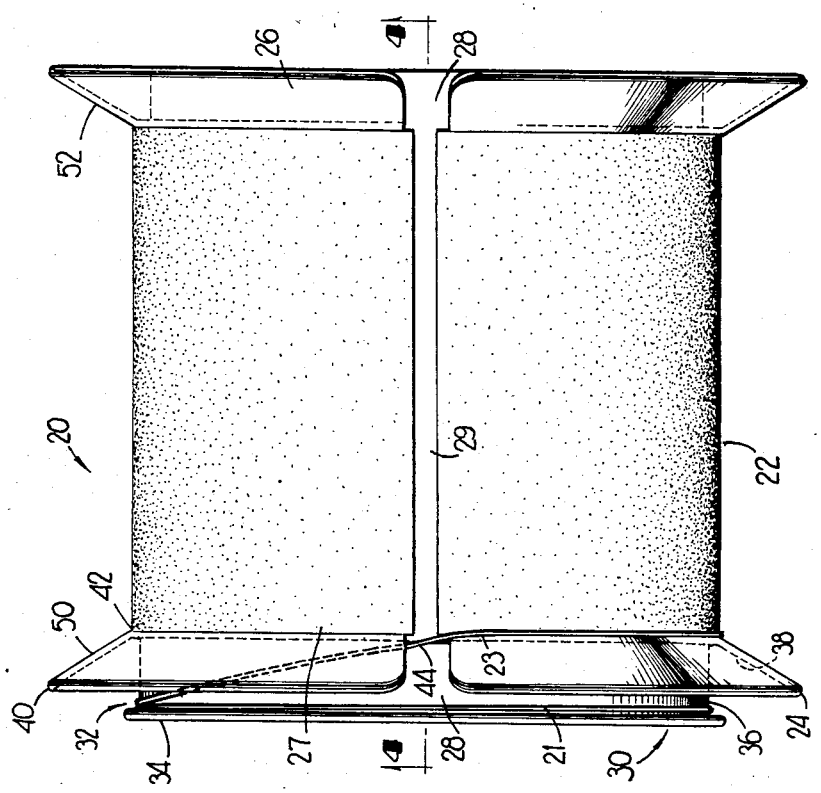
FIG. 2 is a plan view of the spool of FIG. 1.
Figure 1:
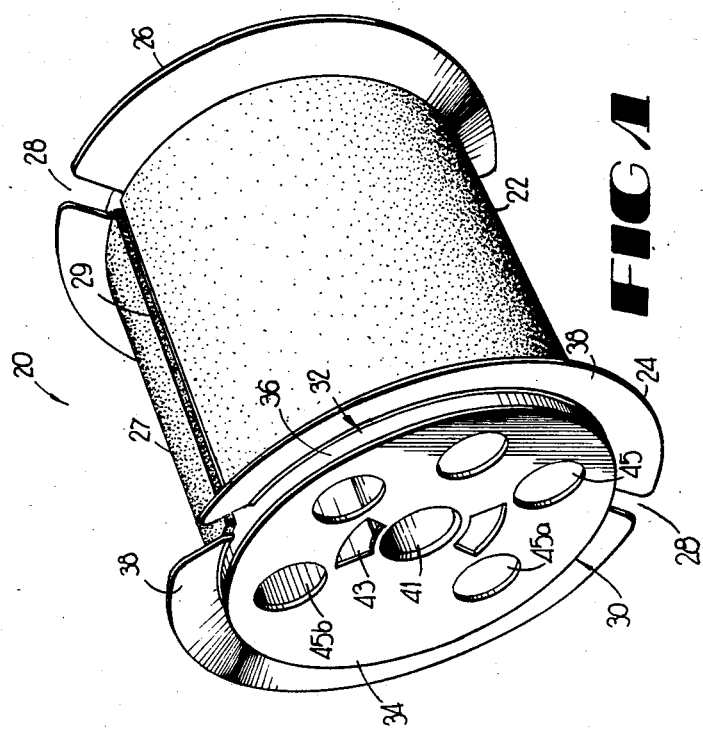
FIG. 1 is a perspective view of a spool of this invention.
Figure 3:
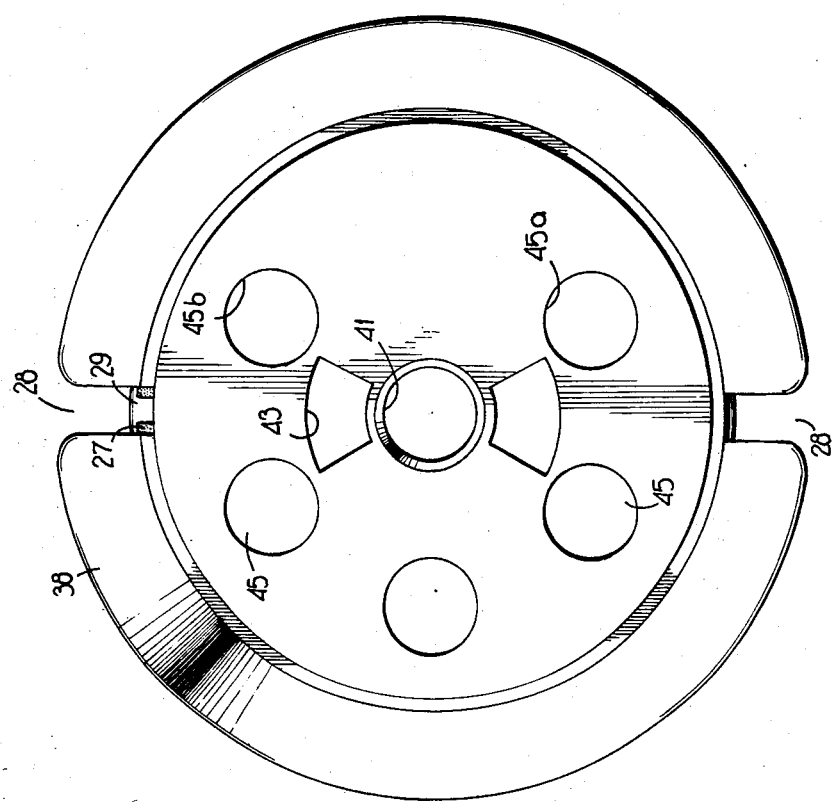
FIG. 3 is an end view of the spool of FIG. 1.

Referring now to FIGS. 1-3, there is shown a perspective view of a spool which is designated generally by the numeral 20. The spool 20 is adapted to hold a plurality of convolutions of optical fiber 23 which are wound thereon and which are depicted by circles and designated by the numerals 21—21 (see FIG. 4). Accordingly, the spool 20 may be used as a take-up spool in an automatic takeup apparatus. Also, it may be used to pay out optical fiber in a cabling line, to store optical fiber and as a means to ship optical fiber. The spool 20 may be made of a polyethylene or ABS material or a cellular styrene material.

As can be seen in FIGS. 1 and 2, the spool 20 includes a hub 22 which is cylindrical in shape and two flanges designated 24 and 26 which are attached to the hub at opposite ends thereof. In a preferred embodiment, the hub 22 is covered with a foam material 27 which cushions optical fiber which is wound in convolutions about the hub. In the preferred embodiment, the foam material is made of a polyurethane or polyethylene material and has a thickness of about 0.48 cm. Each of the flanges 24 and 26 has a truncated conical shape having an inner diameter which is about the same diameter as the diameter of the hub 22 and an outer diameter which is larger than the inner.

As can be seen best in FIGS. 1-3, each of the flanges 26 and 24 includes diametrically opposed slots 28—28. The slots 28—28 are suitable for allowing portions of an optical fiber 23 to extend therethrough. Further, the slots 28—28 in one flange are aligned with the slots in the other flange. In the preferred embodiment, a slot 29 is provided in the foam material 27 which extends between and is aligned with two of the aligned slots in the flanges. This arrangement permits removal of start-up scrap convolutions of optical fiber 23 on the spool 20 by using a cutter blade (not shown) without damaging the spool.

Figure 4:
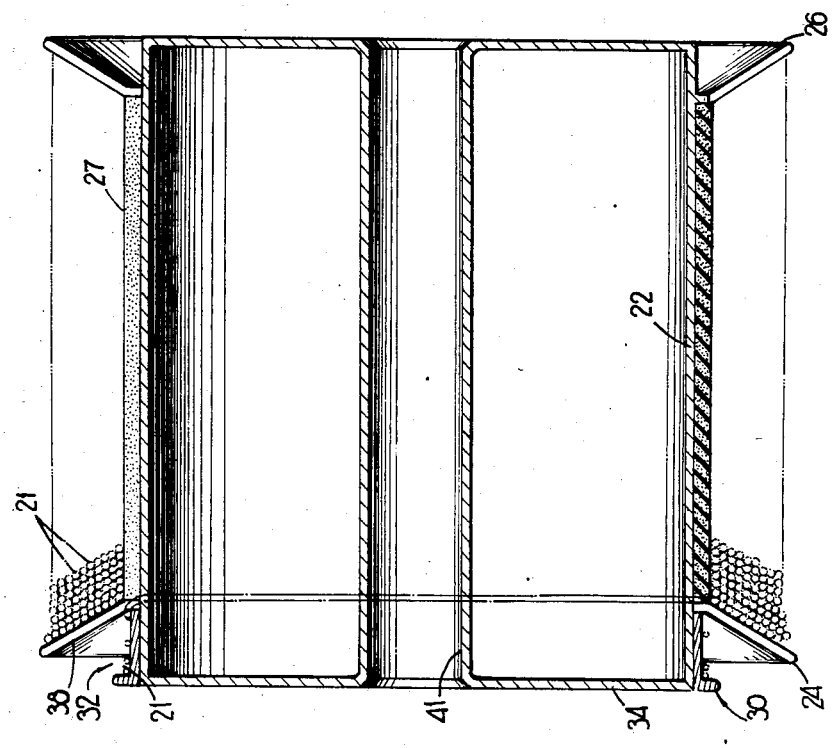
FIG. 4 is an elevational view in section of the spool of FIG. 2 taken along lines 4—4 thereof.

The spool 20 is also provided with a collector device which is designated generally by the numeral 30. As is seen in FIG. 1, 2 and 4, the collector device 30 includes a groove 32 which is defined by a flange 34, a cylindrical surface 36 and an outer surface 38 of the flange 24. The grooves 28—28 of the flange 24 facilitate communication between the groove 32 of the collector device and the hub 22 of the spool. As can be seen in FIG. 2, an outer diameter peripheral edge 40 of the flange 24 overhangs a portion of the cylindrical surface 36 of the collector device.

In the preferred embodiment, each of the flanges 24 and 26 has an outer diameter of 20.8 cm and an inner diameter of about 15.2 cm. The length of the hub is about 14.5 cm, the overall length of the spool 20 is 18.3 cm and the overall distance from the outside of the flange 24 to the outside of flange 26 is about 17.5 cm. The diameter of the flange 34 of the collector spool is about 16.8 cm and its thickness is about 0.24 cm.

The collector device 30 is adapted to collect a few convolutions 21—21 of the optical fiber 23 which are wound on the spool 20. More particularly, it is adapted to collect the first few convolutions 21—21 which are wound on the spool 20 when the spool is used in a fiber drawing automatic take-up apparatus. During takeup, the distributor (not shown) is caused to be moved from alignment with a full spool into alignment with a clamping device (not shown) which retains the free end of the optical fiber 23 after the optical fiber on this spool 20 is severed from that on the full spool. Then the distributor is moved transversely across the flange 34 to cause a few convolutions 21—21 of the optical fiber 23 to be received in the groove 32 of the collector device 30.

Afterwards, the distributor is caused to be moved to a position in line with a junction 42 (see FIG. 2) between the hub 22 and the inner face of the flange 24. This causes the optical fiber to be led through one of the slots 28—28 and to begin to be wound on the hub 22. The clamping device retains the free end of the optical fiber 23 which would otherwise become loose in the groove 32. After the hub 22 is filled with convolutions 21—21 of the optical fiber 23 or provided with a predetermined amount of the optical fiber, distribution is moved to positions required for moving the optical fiber to another empty spool.

It should be observed that the spool 20 need not be used in an automatic takeup apparatus. Instead, an initial portion of optical fiber 23 can be wound manually in the groove 32 of the collector device, the optical fiber passed through one of the slots 28—28 in the flange 24 and then convolutions 21—21 wound on the hub 22.

Of importance in the collection of a few convolutions 21—21 of the optical fiber 23 and the takeup of the main portion of the package is the slot 28 through which a portion 44 (see FIG. 2) of the optical fiber extends. As can best be seen in FIG. 2, the width of the slot 28 is such that when the portion 44 of the optical fiber extends therethrough, it does so at a gentle angle with minimum curvature to avoid inducing macrobending or microbending losses in the optical fiber. Furthermore, the thickness of the flange 24 is constant and the intersection of the outer surface 38 of the first flange and the wall of the slots 28—28 in the first flange are provided with a radius. These provisions also help to maintain a gentle angle for the portion 44 of the optical fiber 23 which extends from the convolutions 21—21 in the groove of the collector device 30 to the convolutions 21—21 on the hub 22. If the flange 24 had an outer face which was normal to the surface of the collector groove 32, the flange would have a solid truncated conical shape and the width of the flange adjacent to the collector groove would be so thick that the curvature of the connecting length 44 of optical fiber would increase and possibly result in a localized section of high loss.

Each of the flanges 26 and 34 is provided with a central opening 41, two arcuately shaped openings 43—43 and a plurality of other openings 45—45. (see FIGS. 1 and 3-4). The central opening is adapted to receive an arbor of a winding or payout apparatus whereas the openings 43—43 and 45—45 are adapted to receive driving dogs of takeup or payout apparatus or fingers of operators wishing to reposition or transport the spools. The space between openings 45a and 45b is provided for affixing an optical fiber identification label or tag to the spool.

The configuration of the spool 20 is such as to be able to maximize the amount of optical fiber 23 which can be held between the flanges 24 and 26 while avoiding substantially any snagging of any of the convolutions 21—21 of the optical fiber. As will be recalled from the discussion under the Background of the Invention hereinbefore, the use of prior art optical fiber collection spools having parallel faced flanges frequently resulted in gaps between the last convolution adjacent to each flange in each layer. This led to snagging as subsequent end convolutions moved into these gaps, perhaps moving several layers toward the hub 22 and causing undue tension or snags as the optical fiber was payed out.

Advantageously, the spool configuration of this invention is such that these gaps are avoided. This is accomplished by using the flanges 24 and 26 having inner faces 50 and 52, respectively, which taper outwardly from the hub 22. As a result, each succeeding layer of wound optical fiber includes more convolutions 21—21 than the prior layer. Because of this arrangement, the last convolution 21 of each layer at each flange engages the flange. In the event the layer below it is gapped from the flange, the outermost convolution can only descend through one layer before engaging the inner face of the flange.

This arrangement allows flange-to-flange winding of the convolutions 21—21 of the optical fiber 23 without risking snagging in gaps. Inasmuch as the full capacity of the spool is usable, it is unnecessary to resort to the winding of the optical fiber in tapered packages as shown in previously identified U.S. Pat. No. 4,545,542. Also, this spool allows the normal convolution winding of the optical fiber 23 as opposed to basket weave patterns which have been resorted to by some fiber producers in order to avoid the gap problem. The absence of snagging in addition to being able to maximize the capacity and to utilize the full capacity of each spool makes the spool an attractive packaging device for optical fiber producers who wish to process the fiber in subsequent operations or to ship that fiber to end users.

The angle which each flange makes with the longitudinal axis of the hub is important in being able to realize the full advantage of the tapered flange spool 20. In the spool 20, this geometrical relationship may be defined by an angle α which the inner surface of each uniform thickness flange 24, and 26 makes with the longitudinal axis of the hub. As is seen in FIG. 5, if the angle α is 90° as in prior art spools, each successive layer is wound on a hub 56 so that the convolutions 21—21 of the optical fiber are aligned with each other as between successive layers adjacent to a flange 58. Should the last convolution 21 not engage the flange, a gap is formed between the last convolution 21 and the flange 58. This allows a last convolution of the next layer if wound to the flange to descend into the gap thereby establishing a condition which may lead to snagging of a convolution in the gap and breakage of the optical fiber during payoff. Also, each optical fiber convolution except that engaging the flange wall is somewhat unstable inasmuch as it is not nested between adjacent convolutions of the layer therebelow.

In FIGS. 6 and 7A-7C the angle α between the hub 22 of the spool 20 and the flange 26, for example, is an acute angle. It should be understood that similar views would apply to the other flange 24. Advantageously, the use of an angle α less than 90° may only result in a layering and gap wherein an optical fiber convolution 21 adjacent to the flange can only descend through one layer before engaging the inner surface of the tapered flange. However, for an angle of 30° as shown in FIG. 6, the convolutions 21—21 may not be as stable as desired and the convolutions adjacent to the inner surface of the flange except for that layer contiguous to the hub are not aligned horizontally.

FIGS. 7A, 7B and 7C depict spool arrangements in which the angle α is 75°, 60° and 45°, respectively. In FIG. 7A, the convolutions 21—21 of each layer are aligned horizontally but each convolution of each successive layer appears to engage only one of the convolutions beneath it and adjacent convolutions to each side. In FIG. 7C, the convolutions 21—21 appear much as in FIG. 5 where in some layers, the end convolution may not be aligned with others in the same layer. Furthermore, the packing is not optimized as can be seen by the space 62 formed between convolutions 64, 66, 67 and 69.

In contrast to the above arrangements with varying angles, the arrangement shown in FIG. 7B appears to optimize packing density and hence capacity of the spool. Further, all the convolutions 21—21 in each layer are aligned. Importantly from the standpoint of stability, each convolution 21 of each successive layer after the one adjacent to the hub 22 except end convolutions in each layer is nested between two convolutions of the previous layer. For example, a convolution designated 21a is nested between and in engagement with convolutions 21b and 21d.

Viewing now FIGS. 7B and 7C, it can be seen how the geometry of a spool 20 having angle of 60° is most advantageous. With that angle, in any longitudinal cross-section of the spool through the longitudinal axis of the spool, the intersections of a convolution diameter of each optical fiber which is parallel to the hub 22 with the periphery of the optical fiber are aligned with a centroidal axis 72 of a convolution below or above it. For example, diametral point 74 on the periphery of the convolution 21a in FIG. 7B is aligned with centroidal axis 72b, of the convolution 21b, while opposite diametral point 76, is aligned with the centroidal axis 72c of a convolution 21c, and with the centroidal axis 72d of the convolution 21d. Further, each convolution in each layer nests between another convolution and a flange or two convolutions of another layer. For each convolution other than those outer ones which engage a flange, peripheral points as measured along a line parallel to the hub are aligned with the centroidal axes of the two fibers in another layer between which it nests.

Unlike the arrangement in FIG. 7B, the one in 7A has an angle of 75° between the outer face of the flange and the horizontal. As is seen, the lateral offset between vertical centroidal axes through successive convolutions of adjacent layers is only equal to about one half the radius of an optical fiber instead of the radius as in FIG. 7B. As a result, each convolution in each layer of the package of FIG. 7A is not nested in engagement with two convolutions of another layer but only engages one convolution thereof. This, as should be apparent, leads to a condition which is not as stable as in the arrangement of FIG. 7B.

From the above observations, one can conclude that there is a preferred angle which the inner surface of each flange 24 and 26 makes with the longitudinal axis of the hub 22. In the preferred embodiment, and from the standpoints of packing density and stability, the acute angle α between each flange and the hub 22 of the spool 20 is 60°. That angle results in the repetitive pattern shown in FIG. 7B. Further, a relatively steep angle α, as opposed to a shallow one results in increased capacity for any given spool width and flange and hub diameters.

It is to be understood that the above-described arrangements are simply illustrative of the invention. Other arrangements may be devised by those skilled in the art which will embody the principles of the invention and fall within the spirit and scope thereof.

What is claimed is:

1. A spool which is adapted to hold convolutions of an optical fiber, said spool comprising:
    a hub having a longitudinal axis and a cross sectional configuration which is normal to the longitudinal axis and which is generally circular;
    first and second flanges being attached to opposite ends of said hub with each of said flanges having a truncated conical shape with a large diameter portion thereof facing outwardly and a small diameter portion thereof being attached to said hub and further with said first flange including a slot which is formed radially through said first flange; and
    a collector attached to said first flange for accumulating a few convolutions of the optical fiber to provide access to an end portion of the optical fiber, said collector including a flange and a peripheral surface on which the convolutions are wound with said slot in said first flange having sufficient width and the thickness of said first flange being sufficiently thin to minimize the curvature of a portion of the optical fiber which extends through said slot from convolutions in said collector to convolutions on said hub.

2. The spool of claim 1 wherein said flange of said collector, said peripheral surface and said first flange form a groove in which a predetermined number of convolutions of optical fiber to be wound on said spool are accumulated.

3. The spool of claim 1 wherein a free peripheral edge portion of said first flange overhangs a portion of said peripheral surface of said collector.

4. The spool of claim 3, wherein the thickness of said first flange is substantially constant to minimize the curvature of the portion of the optical fiber which connects the convolutions on said collector with the convolutions on said hub.

5. The spool of claim 1, wherein said spool is made of a cellular material.

6. The spool of claim 1, wherein each of said first and second flanges includes diametrically opposed slots with each slot in said first flange communicating said groove in said collector to said hub, further said slots in said first flange being aligned with said slots in said second flange.

7. The spool of claim 6, wherein said hub is covered with a resilient material.

8. The spool of claim 7, wherein said resilient material is provided with a single groove which extends along said hub and which is aligned with one of the slots in said first flange and an opposing aligned slot in said second flange.

9. The spool of claim 1, wherein the intersection of an outer surface of said first flange and a surface which forms said slot is provided with a radius.

10. The spool of claim 1, wherein the angle which is formed between an inner surface of each said first and second flanges and a longitudinal axis of said hub has a predetermined value to maximize packing density of convolutions of optical fiber wound on said spool and to optimize the stability of the wound package.

11. The spool of claim 10, wherein the acute angle between the inner surface of each said first and second flanges and the longitudinal axis of said hub is about 60°.

12. A packaged length of optical fiber which comprises:
    a spool which is adapted to hold convolutions of an optical fiber, said spool comprising:
        a hub having a longitudinal axis and a cross sectional configuration which is normal to the longitudinal axis and which is generally circular;
        first and second flanges being attached to opposite ends of said hub with each of said flanges having a truncated conical shape with a larger diameter portion thereof facing outwardly and a small diameter portion thereof being attached to said hub and further with said first flange including a slot which is formed radially through said first flange; and
        a collector attached to said first flange for accumululating a few convolutions of the optical fiber to provide access to an end portion of the optical fiber, said collector including a flange and a peripheral surface on which the convolutions are wound with said slot in said first flange having sufficient width and the thickness of said first flange being sufficiently thin to minimize the curvature of a portion of the optical fiber which extends through said slot from convolutions in said collector to convolutions on said hub; and
    a plurality of convolutions of optical fiber which are wound on said hub.

13. The packaged length of optical fiber of claim 12 wherein said flange of said collector, said peripheral surface and said first flange form a groove in which a predetermined number of convolutions of optical fiber to be wound on said spool are accumulated, at least one convolution of the optical fiber being disposed in said collector with said at least one convolution being connected to the convolutions wound on said hub by a portion of the optical fiber which extends through said slot in said first flange.

* * * * *